United States Patent Office 2,862,829
Patented Dec. 2, 1958

2,862,829

MANUFACTURE OF FOAMED GYPSUM AND THE LIKE

John S. Dixon, Jr., Villanova, and Edward J. Koloseus, Media, Pa., assignors to National Foam Systems, Inc., West Chester, Pa., a corporation of Delaware No Drawing. Application July 18, 1956
Serial No. 598,502

5 Claims. (Cl. 106—88)

The present invention relates generally to the production of calcined gypsum compositions in the form of cellular, lightweight structures of sufficient strength and density to serve adequately as building components and more particularly to improvements in the method of aerating a slurry of gypsum stucco by the use of pre-formed foam and of controlling within practicable limits the setting time of the gypsum mix.

It is now known that one of the most practicable, least expensive and most easily controlled methods of aerating cementitious mixes to produce cellular, lightweight building components involves the use of preformed foam introduced into the mix after all other basic ingredients thereof have been handled and mixed together in the usual manner. However, in the case of a gypsum stucco mix such introduction of only pre-formed foam has the effect of unduly prolonging the setting time of such mix, the retardation of the set being so great in certain instances to make wholly impracticable the use of pre-formed foam for aerating and so rendering cellular the gypsum mix. In extreme cases, the gypsum slurry when mixed with the aerating foam never seems to set effectively but instead remains soft and spongy.

We have found that this difficulty may be overcome by incorporating in the gypsum foam mix an agent which so acts to accelerate the setting time thereof as to effectively neutralize the retarding effect of the foam, such agent being either potassium sulfate or sodium sulfate, and among the principal objects of the present invention are not only the utilization of such an accelerating agent for the purpose stated but also the provision of an effective method for satisfactorily incorporating the accelerator in the foamed gypsum mix.

Actually, there appears to be but three methods by which the desired accelerator may be introduced into the gypsum stucco mix, namely:

(1) Incorporating the accelerator in the gypsum mix prior to introduction of the aerating foam.

(2) Incorporating the accelerator in the gypsum mix after introduction of the aerating foam.

(3) Incorporating the accelerator in the pre-mixed solution employed to generate the foam and thereafter introducing such foam into the gypsum mix.

Tests have demonstrated that the first of these procedures is most impracticable and difficult to control primarily due to the fact that the initial addition of the accelerator to the gypsum mix tends to cause it to set or become hard so quickly as to render it incapable of being properly blended with any foam subsequently added thereto. Also, by adding the accelerator to the gypsum mix prior to introduction of foam thereto, the possibility of spot setting is increased, that is, certain portions of the mix tend to set more quickly than others, in consequence of which there is obtained a final product which is non-uniform in texture, density, strength and other physical characteristics. Still further, because the addition of the accelerator tends to rapidly set and harden the mix, a very rigid control of the accelerator proportioned into the mix is required to maintain proper workability thereof at least until all of the required foam is introduced into the mix, and even with such control the mix tends to become so stiff while the foam is being added thereto as to result in break-down of a large proportion of the foam before it is smoothly blended into the mix. Finally, in order to render the first procedures at all practicable, it is necessary to employ an excessive amount of water in the initially prepared gypsum stucco slurry, resulting in decreased strength of the final product.

The second of the above mentioned procedures is somewhat more practical than the first, but it also increases the possibility of spot setting of the gypsum mix and tends to break down and render ineffective a large proportion of the foam introduced into the mix. This breakdown of the foam not only results in a non-uniform final product but also reduces the overall volume of the mix. Furthermore, it has been found that adding the accelerator to the mix after incorporation therein of the foam requires the use of an excessive amount of accelerator in order to insure its effective distribution throughout the mix. Even so, the accelerator is more likely than not to be unequally distributed throughout the prefoamed gypsum mix. And, finally, the addition of the accelerator into the foamed gypsum mix necessarily involves additional mixing time beyond that required for initially preparing the gypsum stucco slurry and then blending into it the aerating foam.

It has been noted also that when the accelerator is incorporated directly in the gypsum mix either before or after introduction of foam into the mix, the amount of accelerator used necessarily varies with the amount of foam introduced into the mix, and that a final aerated product of low density requires a greater percentage of accelerator than would that of high density.

Our studies and tests have shown that the third procedure above mentioned is by far the most practicable and the simplest of all for the efficient production of an aerated gypsum composition of the desirable physical properties. Not only does it eliminate the defects of and overcome the objections to the first mentioned procedures, but it also has certain inherent advantages of its own.

By incorporating the accelerator in the pre-mixed foam-forming solution, the production of the final aerated gypsum composition involves only two mixing operations, namely, first, the preparation initially of the water-gypsum stucco slurry and, second, the blending into the slurry of the foam produced by use of the foam-forming solution containing the accelerator.

Further, by addition of the accelerator directly to the pre-mixed foam-forming solution, the amount of accelerator used is never excessive but instead need be only such as is required to overcome the retardation effect of the foam-producing liquid concentrate itself.

By introducing into the gypsum stucco slurry an aerating foam which contains a predetermined amount of the accelerator, the foam in itself operates effectively to control the setting time of the gypsum mix. Because gypsum stucco produced on a commercial scale is inherently subject to variations in its setting time, it is most desirable that such set time be controlled simply by varying the amount of accelerator in the pre-mixed foam-forming solution. Thus, in accordance with the present invention, one may introduce into the gypsum mix an aerating foam containing the accelerator in an amount sufficient to retard or accelerate, as desired, the setting time of the mix, the set time being varied according to the proportion of accelerator present in the foam-forming solution. Indeed, where it is desired simply to permit the gypsum mix to set in accordance with its natural setting time pattern, the foam-forming solution need contain only so much of the accelerator as would neutralize the normal retarding effect of the foam when introduced into the gypsum slurry. For this last stated purpose, the foam might properly be considered as a neutral set time foam as distinguished from an accelerating set time foam or a retarding set time foam.

Having in mind all of the foregoing, it may be stated that the principal object of the present invention is to provide for the economical and efficient production of an aerated calcined gypsum composition by the use of mechanical or air foam which serves not only to aerate the gypsum mix for production of a cellular, lightweight gypsum structure as the final product but also as the vehicle for uniformly distributing throughout the mass of the composition the agent for controlling the setting time of the gypsum mix.

In the production of the lightweight, cellular gypsum composition in accordance with the present invention, any suitable gypsum mix of conventional formula may be employed, it being generally customary to use about 10 pounds of water to 30 pounds of calcined gypsum (stucco) in preparation of the initial slurry.

Immediately upon preparation of this slurry, there is added thereto a predetermined amount of pre-formed foam containing the accelerating agent, which may be either potassium or sodium sulfate. The foam is dispersed as uniformly as possible throughout the gypsum mix by continuing the mixing operation for several minutes after first introduction of the foam whereupon the foamed gypsum mix is ready to be poured, injected or otherwise introduced into suitably prepared forms or molds in which it sets and hardens to the shape determined by the form or mold used as will be well understood. In certain instances, the gypsum stucco slurry may be initially prepared and the foam admixed therewith directly in the form or mold in which the mass is shaped to its final form.

Inasmuch as the foam employed is completely preformed prior to its introduction into the gypsum mix, no expansion of the foamed or aerated mix occurs within its containing form or mold and consequently the gypsum mix may be permitted to set and harden as soon as desired after the required amount of foam has been incorporated therein.

The requisite foam is produced by intimate admixture of air or other compatible gas, such as nitrogen, with a premixed solution of a suitable foam-forming liquid, which gas and liquid are both delivered to a mixing head and foam discharge nozzle under suitable pressure and in which they are intimately co-mingled for discharge therefrom as a stable foam having bubbles of uniform small diameter.

The premixed foam-forming liquid preferably is of the type produced by alkaline hydrolysis of any suitable animal or vegetable proteinaceous material, of which an hydrolysate is prepared by suitable admixture of caustic soda and lime acting as a hydrolyzing agent. An hydrolysate satisfactory for the production of foam to be incorporated in a gypsum stucco slurry may be prepared in accordance with the following procedure, although it is to be understood that the present invention is not intended to be limited to the use of any particular proteinaceous foam-producing liquid:

To 2600 gallons of water heated to from 190° to 200° F. is added 2600 pounds of a suitable proteinaceous material, such as soya bean, dried blood, albumen fish meal, feather meal and the like, the mixture being stirred for some ten minutes. To this mixture there is first added 450 pounds of lime and then 35 pounds of sodium hydroxide, to initiate an hydrolysis which is continued for about 7 hours at the above stated temperature. Thereafter there is added to the hydrolystate about 50 gallons of concentrated sulphuric acid and the pH thereof adjusted to approximately 4.0. This acidified hydrolysate is then heated, at the above temperature, for an additional hour, during which it is continuously stirred, and thereupon its pH is raised to 7.6 by the addition of approximately 50 pounds of lime.

The hydrolysate so produced is then filtered and evaporated to a specific gravity of 1.195 to provide a liquid yield of about 465 gallons, to which liquid is then slowly added with stirring over a period of about 20 minutes an aqueous solution of ferrous sulfate made up of 132 pounds of ferrous sulfate dissolved in 30 gallons of hot water.

To each 100 gallons of this final hydrolysate, heated to 120° F. and having a specific gravity of 1.170, is then added, with constant stirring, a solvated calcium chloride solution compounded of 100 pounds of calcium chloride hexa-hydrate, 10 gallons of isopropyl alcohol and 4 gallons of water, the mixing of which in the hydrolysate is continued for one hour followed by filtering to produce the final foam-forming liquid.

The water-soluble foam-forming liquid produced as above described or otherwise to form stable foam of optimum expansion, ranging from 15 to 30 gallons of foam per gallon of foam-forming solution, is combined with water in the preferred ratio of about 1 part of the liquid to about 40 parts of water to provide a pre-mixed foam-forming solution, to which is added potassium sulfate in the proportion of about 1.5 pounds for each 5 gallons of water in the pre-mixed solution. The solution thus prepared is charged into a suitable supply tank which is air pressurized to provide discharge of the solution from the tank at a nozzle discharge pressure of about 80 p. s. i., the tank being provided with a suitable discharge hose leading to a suitable foam producing unit wherein air or other suitable gas under pressure is entrained and intimately mixed with the foam-forming solution for discharge therefrom in the form of a stable foam. Such a foam producing unit is disclosed in the pending application of John S. Dixon, Jr. and George B. Geyer, Serial No. 409,045, filed February 9, 1954, the pertinent description of which is included herein by reference.

The amount of pre-formed foam incorporated into a given volume of the gypsum stucco slurry of a specific formula will vary, of course, depending upon the ultimate density desired for the final gypsum product. For example, to produce of a gypsum slurry made up of 30 pounds of gypsum stucco to about 10 pounds of water, a final foamed gypsum composition having an air dried density of approximately 40 pounds per cubic foot, approximately 3 gallons of the pre-formed foam should be incorporated in the slurry. For such composition, the set time is approximately 30 minutes.

Should it be desired to obtain a final composition having a density of 70 pounds per cubic foot, approximately 0.5 gallon of foam should be incorporated in the slurry made up of 30 pounds of gypsum stucco and 10 pounds of water. Since the pre-mixed foam-forming solution remains unchanged, the set time for this heavier final product would also be approximately 30 minutes. Of course, the above figures are only approximate and would be varied as may be required for the production of a final product having certain specified characteristics.

Should a faster set time be desired, the proportion of accelerator in the pre-mixed foam-forming solution would be increased and, conversely, if a longer set time is required, the proportion of accelerator would be decreased. We have found that for all practical purposes, where potassium sulfate is employed as the accelerating agent, it may be employed in the proportion of from 0.5 to 2 pounds for each 5 gallons of water used in the pre-mixed foam-forming solution prepared as above described, the amount of accelerator used being dependent upon the setting time desired. Where sodium sulfate it employed as the accelerator, either in its anhydrous or hydrated state, about 5 percent more of it by weight is required than of potassium sulfate, and except for this it may be used equally as well as potassium sulfate.

There are a number of factors which affect the normal or natural setting time of a gypsum mix of any given formula, as, for example, high-speed mixing or extreme agitation of the gypsum slurry; low water to gypsum stucco ratio; the presence in the gypsum slurry of small amounts of previously set gypsum material; the use of gypsum stucco that has been exposed to dampened storage conditions for a period of time prior to its use in preparation of a slurry thereof. In addition, the processes involved in the calcination of gypsum rock for converting it from its dihydrate state ($CaSO_4 2H_2O$) to its semi hydrate state ($CaSO_4 \tfrac{1}{2} H_2O$) measurably affect the set time of the final gypsum composition.

By incorporating an accelerator, such as sodium or potassium sulfate, in the foam-forming solution and thereafter introducing the foam formed thereof into the gypsum stucco slurry, there is provided a convenient means for controlling the setting time of the slurry and for adjusting it as desired to compensate for those factors which adversely affect and normally render difficult the uniform and controlled setting of the normal gypsum slurry.

It will be understood, of course, that the present invention is susceptible of various changes and modifications which may be made from time to time without departing from the general principles or real spirit thereof, and it is accordingly intended to claim the same broadly, as well as specifically, as indicated by the appended claims.

What is claimed as new and useful is:

1. A method of producing a cellular gypsum product which consists in initially producing a calcined gypsum-water slurry and in then introducing into said slurry a predetermined volume of pre-formed foam produced by the entrainment of a gas in a pressurized finely-divided stream of a proteinaceous foam-forming solution containing an alkali metal sulfate as a setting time accelerator in an amount sufficient to control the setting time of the foamed slurry.

2. A method as defined in claim 1 wherein said accelerator is potassium sulfate.

3. A method as defined in claim 1 wherein said accelerator is sodium sulfate.

4. A method of producing a lightweight, cellular gypsum composition which consists in adding to a calcined gypsum-water slurry a predetermined quantity of a pre-foamed foam formed of a gas combined under super-atmospheric pressure with a proteinaceous solution of a foam-forming liquid containing as an additive thereto an alkali metal sulfate an agent for controlling the set time of the foamed slurry, the accelerating agent being present in the foam-forming solution in the approximate proportion of from 0.5 to 2.0 pounds of said agent to each 5 gallons of the solution.

5. A method of producing lightweight, cellular gypsum blocks, slabs and other articles of definitely formed or molded shape which consists in initially preparing a gypsum stucco slurry, in preparing an aqueous foam-forming solution containing an alkaline hydrolysate of proteinaceous material and an alkali metal sulfate as an agent for accelerating the set time of the slurry, in pressurizing said solution in a tank closed to atmosphere, in producing foam from said solution by introducing into a high velocity stream thereof issuing from said tank a gas under super-atmospheric pressure, and in then incorporating said foam into the slurry to render the same cellular in structure, the foam being thoroughly mixed with the slurry and serving as a vehicle for uniformly dispersing the setting agent throughout the mass for the foamed slurry.

References Cited in the file of this patent

UNITED STATES PATENTS

| 1,787,162 | New | Dec. 30, 1930 |
| 1,951,691 | Coxon | Mar. 20, 1934 |
| 1,970,663 | Lefebure | Aug. 21, 1934 |
| 2,322,194 | King | June 15, 1943 |
| 2,370,058 | Maguire | Feb. 20, 1945 |
| 2,383,252 | Huntzicker | Aug. 21, 1945 |
| 2,494,403 | Niles et al. | Jan. 10, 1950 |

FOREIGN PATENTS

| 119,812 | Australia | Sept. 23, 1943 |